(12) United States Patent
Garrigues et al.

(10) Patent No.: US 10,491,564 B2
(45) Date of Patent: Nov. 26, 2019

(54) PROCESS FOR ASSIGNING A NETWORK ADDRESS TO A TERMINAL NETWORK-ELEMENT, NETWORK, INTERCONNECTION NETWORK-ELEMENT, ADDRESSING SERVER AND ASSOCIATED TERMINAL NETWORK-ELEMENT

(71) Applicant: BULL SAS, Les Clayes sous Bois (FR)

(72) Inventors: Philippe Garrigues, Montbonnot (FR);
Benoit Welterlen, Grenoble (FR);
Céline Bourde, Fontaine (FR)

(73) Assignee: BULL SAS, Les Clayes sous Bois (FR)

( * ) Notice: Subject to any disclaimer, the term of this patent is extended or adjusted under 35 U.S.C. 154(b) by 186 days.

(21) Appl. No.: 14/947,684

(22) Filed: Nov. 20, 2015

(65) Prior Publication Data

US 2016/0149857 A1 May 26, 2016

(30) Foreign Application Priority Data

Nov. 20, 2014 (FR) ...................................... 14 61276

(51) Int. Cl.
*H04L 29/12* (2006.01)
(52) U.S. Cl.
CPC ................................ *H04L 61/2015* (2013.01)
(58) Field of Classification Search
CPC ............................ H04L 61/2015; H04L 61/20
See application file for complete search history.

(56) References Cited

U.S. PATENT DOCUMENTS

| 7,337,224 B1 * | 2/2008 | Van Horne, III ............................ H04L 29/12283 709/223 |
| 8,369,246 B2 * | 2/2013 | Wen ........................ H04L 12/18 370/256 |
| 2005/0163118 A1 | 6/2005 | Steindl |

(Continued)

FOREIGN PATENT DOCUMENTS

EP 1558002 A1 * 7/2005 ....... H04L 29/12254

OTHER PUBLICATIONS

Patrick, M., "DHCP Relay Agent Information Option", RFC 3046, Network Working Group, Jan. 2001.*

(Continued)

*Primary Examiner* — Khaled M Kassim
*Assistant Examiner* — Saad A. Waqas
(74) *Attorney, Agent, or Firm* — Patterson Thuente Pedersen, P.A.

(57) ABSTRACT

The invention relates to a process for assignment, by an addressing server for a network, of a network address to a terminal network-element connected to one of the connection ports of one of the interconnection network-elements of said network, comprising: transmission of a network address request by said terminal network-element to said interconnection network-element, the determination by said interconnection network-element of a location of said terminal network-element where said location combines a topological identifier for said interconnection network-element with at least one identifier for said connection port, the transmission by said interconnection network-element to said addressing server of said request with said location, assignment by said addressing server to said terminal network-element of said network address based on said location.

18 Claims, 2 Drawing Sheets

(56) References Cited

U.S. PATENT DOCUMENTS

| | | |
|---|---|---|
| 2008/0025299 A1 | 1/2008 | Agarwal et al. |
| 2010/0091779 A1 | 4/2010 | Juhl et al. |
| 2016/0164774 A1* | 6/2016 | Besaw .................. H04L 45/28 709/239 |
| 2016/0301595 A1* | 10/2016 | Ashida .................. H04L 69/22 |

OTHER PUBLICATIONS

Droms, R., "Dynamic Host Configuration Protocol", RFC 2131, Network Working Group, Mar. 1997.*
Steindl, G., EP 1558002 A1 (English Translation of Specification).*
Search Report from French Application FR 1461276 dated May 27, 2015, 8 pgs. No English translation available.
Patrick Motorola BCS M: "DHCP Relay Agent Information Option; rfc3046.txt", 20010101, Jan. 1, 2001 (Jan. 1, 2001), XP015008829, ISSN: 0000-0003 * abrégé * * alinéas [01.1], [01.2], [0002], [03.1] *.
Droms Bucknell University R: "Dynamic Host Configuration Protocol; rfc2131.txt", 19970301, Mar. 1, 1997 (Mar. 1, 1997), XP015007915, ISSN: 0000-0003 * alinéas [0002], [04.1], [4.3.1] *.

* cited by examiner

PROCESS FOR ASSIGNING A NETWORK ADDRESS TO A TERMINAL NETWORK-ELEMENT, NETWORK, INTERCONNECTION NETWORK-ELEMENT, ADDRESSING SERVER AND ASSOCIATED TERMINAL NETWORK-ELEMENT

RELATED APPLICATION

The present application claims priority to French Application No. 14 61276 filed Nov. 20, 2014, which is incorporated herein in its entirety by reference.

FIELD OF THE INVENTION

The invention relates to a process for assigning a network address to a terminal network-element, the network in which a network address is assigned to a terminal network-element of this network, an interconnection network-element for a network in which a network address is assigned to a terminal network-element of this network and an addressing server for a network in which a network address is assigned to a terminal element of this network, and a terminal element for a network to which a network address is assigned.

BACKGROUND OF THE INVENTION

According to prior art, an Ethernet network in which the IP addresses (IP for "Internet Protocol") are assigned to terminal network-elements of this Ethernet network by using the DHCP protocol (DHCP for "Dynamic Coast Configuration Protocol") using the respective unique manufacturing identifiers thereof that are the respective MAC addresses (MAC for "Media Access Control") thereof is known. This is how this addressing process works.

On this Ethernet network, each terminal network-element which has an Ethernet network card announces its presence on this Ethernet network during its start-up by using the DHCP protocol An addressing server which is continuously listening for this DHCP protocol and which therefore monitors the transmission of all IP address requests by a terminal element of the Ethernet network in this DHCP protocol is configured to respond to this terminal network-element by dynamically assigning it an IP address which will become the IP address thereof and which will remain the address so long is this terminal network-element remains on this Ethernet network.

The identity of a terminal element on the Ethernet network is defined by the unique physical address thereof on this Ethernet network, which is the MAC address thereof. In order to meet the security requirements required for avoiding network malfunctions related to incorrect or random IP address assignments, the addressing server is configured so as to assign an IP address to a terminal network-element only if a security condition is met. This security condition is met if the MAC address of this terminal network-element is previously known by the addressing server which can then identify this terminal network-element on start-up thereof on the Ethernet network.

When the set of terminal elements of an Ethernet network is aggregated to form a supercomputer, and when the number of these network-elements becomes very large, then the number of MAC addresses to be collected, catalogued and managed also becomes very large. In order to operate correctly and be able to assign the required IP addresses to the terminal elements of the Ethernet network, the addressing server must then know the complete list of the set of the respective MAC addresses of the set of terminal elements of the Ethernet network. This complete knowledge calls for a dedicated, long and complex configuration of the addressing server.

During the installation of such an Ethernet network to form a supercomputer, several phases are done.

A first installation phase includes the physical installation and electrical startup of all the elements of the Ethernet network, in particular the interconnection network-elements (still called "switches") and the terminal network-elements.

A second installation phase includes the configuration of the core of the Ethernet network including in particular the configuration of the VLAN (VLAN for "Very Large Area Network") and the IP routing.

A third installation phase includes the IP addressing of the diverse equipment connected to the Ethernet network, where the IP addressing is done by using the DHCP protocol. In order to do that, the complete knowledge, by the addressing server, of all MAC addresses can be obtained either by execution of an automatic harvesting tool or by the direct insertion from a previously known and catalogued list of MAC addresses. The IP addressing is done by a DORA type session (DORA for "Discovery/Offer/Request/Acknowledge") for the DHCP protocol At the end of this DORA session, the terminal element of the Ethernet network has obtained the IP address thereof allowing it to operate properly within this Ethernet network.

Additionally, during a hardware failure, for example a terminal network-element failure, the entire process of collection and management of the MAC address of the terminal network-element replacing the failed network-element must be restarted and the addressing server is reconfigured so as to incorporate this new MAC address. The number of breakdowns among the terminal elements of this Ethernet network can reach 3 to 5% of the terminal network-elements during the lifetime of this Ethernet network, which corresponds to a notable absolute number of failures because the number of terminal elements contained in this Ethernet network can quickly become very large and amount to several thousands to tens of thousands of terminal network-elements, typically between 5000 and 50,000 terminal network-elements.

Whether it is during the installation of the network or else during the maintenance of the network during hardware failures, the use of MAC addresses, while useful as unique identifiers of the network-elements, has several disadvantages First, the process of collecting and managing these MAC addresses is very long and can become even longer as the number of elements on the network grows, which is in particular the case of a network configured for operating as a supercomputer. In particular, the MAC address discovery phase is particularly long and empirical.

Next, once different network-element types are coexisting on the network, which can frequently happen, the process of collecting and managing MAC addresses needs to be adapted for each network-element type, making this same process fairly heterogeneous and therefore more complex to implement.

BRIEF DESCRIPTION OF THE INVENTION

The purpose of the present invention is to provide a process for assigning network addresses to network-elements at least partially remedying the aforementioned disadvantages from the prior art.

More specifically, the invention aims to provide a process for network address assignment to network-elements which, while meeting the necessary security requirements, is both faster and also more homogeneous and therefore less dependent on the diversity of elements within the network.

In order to do that, instead of using the unique manufacturing identifier of the network-element requesting a network address which requires prior long and complex collection thereof, the invention proposes to determine the location of the network-element requesting a network address and use this location in order to assign the network address thereof to it more quickly and/or more simply.

The improvement in network addressing speed is even more attractive when the network includes many network-elements. The time savings can be effective both during initial installation of a network in computer or supercomputer configuration, during maintenance as time goes on and as equipment failures occur in the network.

The improvement in network addressing homogeneity is even more attractive when the network includes a large variety of equipment types.

During network installation, the knowledge of the network cartography, meaning the organization and distribution of the equipment on the network, serves to easily locate the network-element requesting a network address and simply assigning a network address thereto because of the use of the location thereof on the network.

The location on the network includes geographic or topological information about the area where the requesting network-element is located. This location will be sufficiently precise to constitute a unique differentiating element with which to distinguish and single out the network-element requesting a network address from among all network-elements.

The network can advantageously be an Ethernet network, but also any other network type. The required network address can advantageously be an IP address, but also another network address type. The communication protocol between the network-element requesting a network address and the addressing server can advantageously be the DHCP protocol, but also another protocol type.

For this purpose, the invention proposes a process for assignment, by an network addressing server, of a network address to a terminal network-element connected to one of the connection ports of one of the interconnection elements of said network, comprising: transmission of a network address request by said terminal network-element to said interconnection network-element, the determination by said interconnection network-element of the location of said terminal network-element where said location combines a topological identifier for said interconnection network-element with at least one identifier for said connection port, the transmission by said interconnection network-element to said addressing server of said request with said location, assignment by said addressing server to said terminal network-element of said network address based on said location.

For this purpose, by extending the network address assignment process performed by the terminal network-elements to interconnection network-elements as well in order to assign thereto the network address thereof, the present invention proposes a process for assignment, by a network addressing server, of a network address to a secondary interconnection network-element connected to one of the connection ports of one of the main interconnection network-elements of said network, comprising: transmission of a network address request by said secondary interconnection network-element to said main interconnection network-element, the determination by said main interconnection network-element of the location of said secondary interconnection network-element where said location combines a topological identifier for said main interconnection network-element with at least one identifier for said connection port, the transmission by said main interconnection network-element to said addressing server of said request with said location, assignment by said addressing server to said secondary interconnection network-element of said network address based on said location. Iteratively and descending through the network, the network addresses can be assigned first at the level of the interconnection network-element closest to the addressing server and then to interconnection network-elements farther and farther from the addressing server and finally to the terminal network-element.

For this purpose, the present invention also proposes a network comprising: an addressing server, several interconnection network-elements of which at least some comprise several connection ports, several terminal network-elements, where each terminal network-element is connected to said interconnection network-elements by one of said connection ports, where at least one of said terminal network-elements, preferably several of said terminal network-elements or the majority of said terminal network-elements, even more preferably all of said terminal network-elements, are suited for sending a network address request to the interconnection network-element to which it is connected by a connection port, where said interconnection network-element is suited for determining a location of said terminal network-element, where said location combines a topological identifier of said interconnection network-element with at least one identifier of said connection port and for sending toward said addressing server said request with said location, where said addressing server is suited for assigning to said terminal network-element said network address based on said location.

For this purpose, the present invention also proposes network interconnection network-element: comprising several connection ports by which at least several terminal elements for said network are intended to be connected to said interconnection network-element, being suited for receiving from one of said terminal network-elements, preferably from each of said terminal network-elements, a network address request, being suited for determining a location of said terminal network-element from which it received said request, where said location combines a topological identifier for said interconnection network-element with at least one identifier for the connection port through which said terminal network-element is connected to said interconnection network-element, being suited for transmitting said request with said location to an addressing server for said network which is suited for assigning to said terminal network-element said network address based on said location.

An interconnection network-element can also include one or more connection ports by which one or more other interconnection network-elements are intended to be connected to said interconnection network-element.

For that purpose, the present invention again proposes a network addressing server: being suited to receive from an interconnection element for said network, a network address request sent by a terminal element on said network connected to said interconnection network-element and associated, by said interconnection network-element, to a location of said terminal network-element, being suited for assigning said network address based on said location, where said location combines a topological identifier of said interconnection network-element with at least one identifier of the connection port through which said terminal network-element is connected to said interconnection network-element.

For this purpose, the present invention finally proposes a terminal network-element being intended to be connected to an interconnection element for said network comprising an addressing server, by one of the connection ports of said interconnection network-element, and being suited: to send a network address request to said interconnection network-element without specifying the unique terminal network-element identifier thereof, to receive said network address assigned by said addressing server without use of said unique identifier.

According to preferred embodiments, the invention comprises one or more of the following features which can be used separately or in partial combination with each other or in full combination with each other with any one of the previously presented purposes of the invention.

Preferably said transmission of said network address request to said interconnection network-element is done automatically by said terminal network-element. Thus, the addressing server only needs to respond to requests that it receives without having to scan at the initiative thereof all of the terminal elements on the network.

Preferably said transmission of said network address request to said interconnection network-element is done automatically by said terminal network-element upon addition of said terminal network-element to said network. Thus, in case of replacement of one terminal network-element by another, the replacement terminal network-element automatically performs, and at the initiative thereof, the network address request thereof upon addition to the network, in order to become operational as quickly as possible.

Preferably, said network includes a database which stores, for at least one of said terminal network-elements, preferably for several of said terminal network-elements or for the majority of said terminal network-elements, and still more preferably for all said terminal network-elements, a correspondence between said location and said network address, where said addressing server sends said location to said database and said database returns said network address to said addressing server. Because of this database, the only information that the server needs to receive coming from the terminal network-element is the location thereof, location that the interconnection network-elements know and can easily pass-on to the addressing server by adding it to the network address request that they also pass-on to the addressing server.

Preferably, said addressing server returns said network address to said terminal network-element in response to said request via said interconnection network-element. The assigned network address thus goes back down from the addressing server to the terminal network-element by the same communication channel as the one by which the network address request was passed up from the terminal network-element to the addressing server.

Preferably, during said determination, said location combines a topological identifier for said interconnection network-element with an identifier for said connection port and with a discrimination between several terminal network-elements connected to said interconnection network-element by said single connection port, preferably a discrimination between calculation server and hardware controller for said calculation server connected by a single connection port to said interconnection network-element. Thus the location is complete and one-to-one. In fact, the addressing server knows in advance the location of the interconnection network-element; also, an exact location of the terminal network-element is possible with the knowledge of both the connection port of this interconnection network-element to which the terminal network-element is attached and the type of terminal network-element, specifically data processing equipment (calculation server or storage memory) or hardware controller for this data processing equipment both connected to the same connection port. In the DHCP protocol, option 60 and 61 are provided for indicating whether data processing equipment or the hardware controller thereof is involved. Thus, discrimination between the two can be done easily.

Preferably, another parallel network, distinct from said network, preferably physically distinct from said network, is used for configuring said topological identifiers of the various interconnection network-elements of said network. This parallel network ("sideband" type) is a dedicated network for configuring the location parameters of the interconnection network-elements. It is a point-to-point network which has a certain cabling consistency, thus making the location of the interconnection network-elements and also the entire network address assignment process very robust compared to possible cabling errors of the main network which is for example an Ethernet network. Thus, because of this prior configuration, the addressing server will easily and immediately know the location of the various interconnection network-elements. In this way it will be possible to exactly locate the terminal network-element sending a network address request once the interconnection network-element sending this network address request will have added to it the location of the terminal network-element relative to the interconnection network-element sending this network address request.

Preferably, said network address assignment is done during installation of said network, for at least one of said terminal network-elements, preferably for several of said terminal network-elements or for the majority of said terminal network-elements, and even more preferably for all said terminal network-elements. Thus during the installation thereof, the network configuration time, in particular the time for assignment of a network address to each terminal network-element, is sharply reduced.

Preferably said network address assignment is done during replacement of a terminal network-element, for the replacing terminal network-element. Thus, during each replacement of one terminal network-element by another, this address assignment is done quickly and fluidly, maintaining nearly content continuously the fully operational nature of the network.

Preferably, said interconnection network-element is a router or switch. This interconnection network-element is equipment switching the messages traveling in the network.

Preferably said network is a supercomputer. The invention is even more interesting when the network in question needs to be operational quickly and maintain the nearly continuously operational nature thereof, which is the case of a supercomputer.

Preferably, said network includes more than 1000 of said terminal network-elements, preferably more than 3000 and still more preferably more than 10,000. The invention is even more interesting if the network in question includes a large quantity of terminal network-elements. In fact, a large quantity of terminal network-elements in the network leads both to a significant reduction of the configuration time for the installation which otherwise could be very high and additionally reduces the impact of a number of failures occurring in this network which can become notable in the absolute because of the very large number of terminal network-elements, even if the failure rate remains very low, proportionally to the quantity of terminal network-element in the network.

Preferably, said network address is an IP address.

Preferably, said request is a DHCP request. Because of option 82, the DHCP protocol already comprises the possibility of enriching a request with an identifier of the interconnection network-element transmitting the request ("remote_id" in option 82 at the DHCP protocol) and an identifier of the connection port through which this request arrives ("circuit_id" in option 82 of the DHCP protocol). Thus the implementation of the addition of the location to a network address request could be done simply through the use of the DHCP protocol.

Preferably said network is an Ethernet network. For the assignment of network addresses, potential cabling errors inherent in the Ethernet network, which are handicapping in the case of the prior art using MAC addresses of the terminal network-elements, are made practically transparent with the alternate use of the location of the terminal network-elements.

Preferably, said terminal network-element has a unique identifier which is a MAC address which is not used in said assignment process. Use of this MAC address in the prior art makes this network address assignment step particularly long and complex with the need both of a prior listing of all MAC addresses and also of adapting to various types of MAC addresses corresponding to various types of terminal network-elements.

Preferably said terminal network-element is a calculation server or a bay for data storage or a hardware controller for one or another of these equipment, for example a calculation server hardware controller (BMC type for "Baseboard Management Control"). This type of terminal network-element must be able to become operational quickly during its installation and be unavailable the shortest time possible during replacement thereof following a hardware failure.

Other features and advantages of the invention will become apparent upon reading of the description which follows of a preferred embodiment of the invention, given as an example and with reference to the attached drawings.

DETAILED DESCRIPTION OF THE INVENTION

Figure 1:
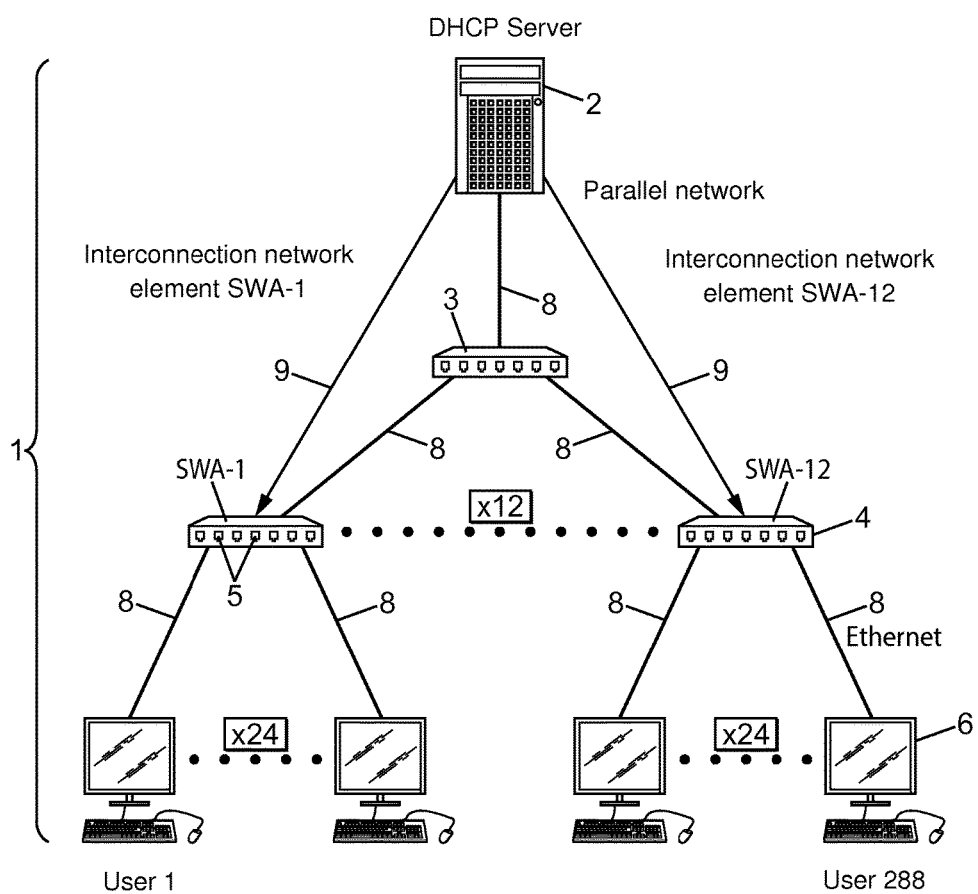
FIG. 1 is a schematic representation of an example of a network according to an embodiment of the invention.
Figure 2:
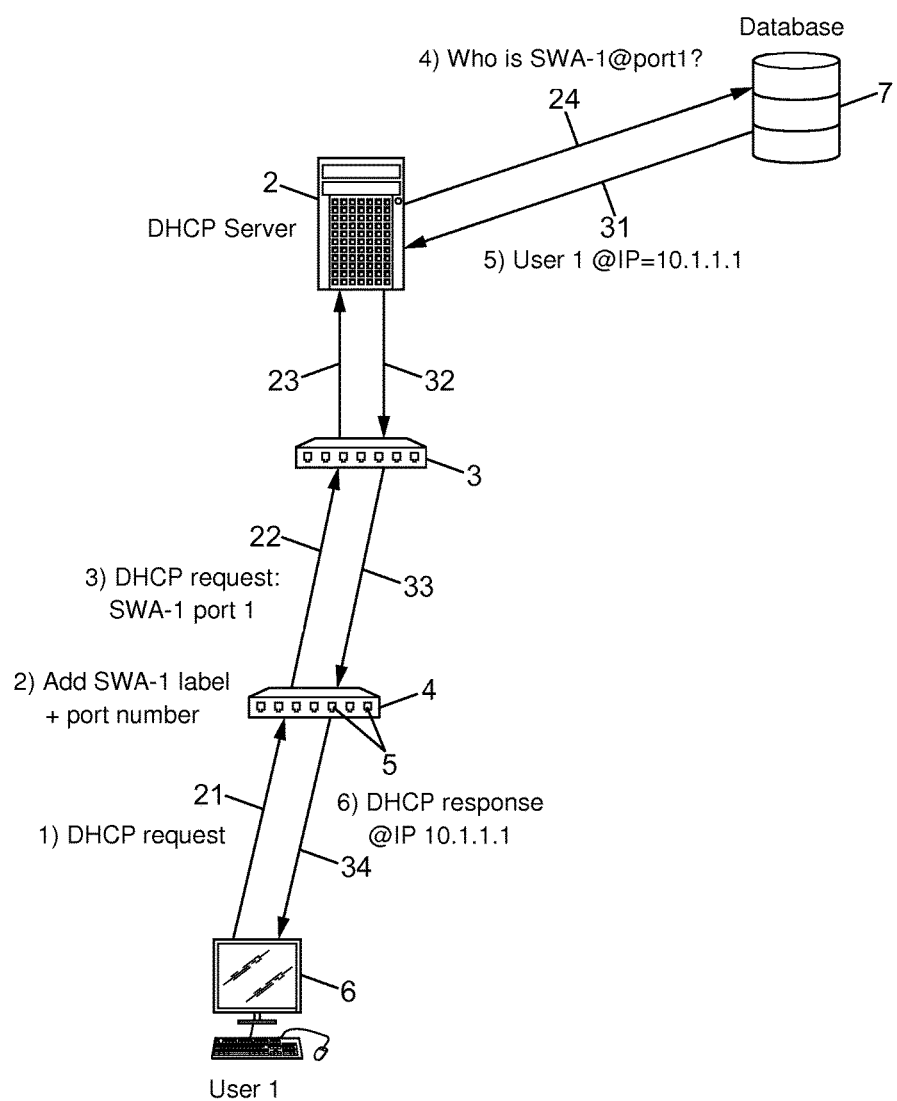
FIG. 2 is a schematic representation of an implementation of the process of assigning a network address to a terminal network-element according to an embodiment of the invention

In FIGS. 1 and 2, the network is an Ethernet network, the required network address is an IP address, the communication protocol between the network-element requesting a network address and the addressing server is the DHCP protocol.

FIG. 1 is a schematic representation of an example of a network according to an embodiment of the invention. The quantity of network-elements shown is very small so as to not reduce the clarity of FIG. 1. In reality, the quantity of interconnection and terminal network-elements and the number of levels of interconnection network-elements are distinctly larger than those shown in FIG. 1. It will be the same for the elements shown in FIG. 2. The small number of elements and levels shown in FIGS. 1 and 2 is however sufficient for explaining and understanding the principle of the invention.

A main network 1 includes an addressing server 2, primary interconnection network-element 3, secondary interconnection network-element 4 having one or more connection ports 5, terminal network-element 6, primary connections 8 within the Ethernet network 1, annex connections 9 within the other parallel network ("sideband" type network) distinct from the main network 1.

The annex connections 9 are functional connections representing the existence of the parallel network ("sideband" type network) which is not structurally shown on FIG. 1 for reasons of clarity, but only functionally via the annex connections 9.

In the Ethernet network 1, via principal connections 8, the addressing server 2 is connected to the primary interconnection network-element 3, the secondary interconnection network-elements 4 are connected to the primary interconnection network-element 3, the terminal network-elements 6 are connected to the secondary interconnection network-elements 4 via connection points 5 which the secondary interconnection network-elements 4 comprise.

FIG. 1 shows one primary interconnection network-element 3, 12 secondary interconnection network-elements 4, 288 terminal network-elements distributed in 12 groups of 24 terminal network-elements respectively connected to 12 secondary interconnection network-elements by means of 24 connection ports 5 which each secondary interconnection network-element 4 includes.

The secondary interconnection network-elements 4 can in particular be switches or routers, which are network-elements able to route data traffic to other network-elements.

The terminal network-elements 6 can in particular be calculation servers, hardware controllers associated respectively with calculation servers, data storage bays which are memory for data storage or groups of memories for data storage, hardware controllers respectively associated with data storage bays. A calculation server can also be called calculation node.

The geographic marking of the Ethernet network 1 is done by means of annex connections 9, by providing an identification field for the main interconnection network-element 3 or the secondary interconnection network-element 4 ("remote_id" field) from the DHCP protocol.

These interconnection network-elements 3 and 4 are marked with information on their location in the cabinet that they occupy and in the machine room in which they are placed. With each interconnection network-element 3 or 4 is associated a topological identifier which has two properties: first locating the interconnection network-element 3 or 4 on the Ethernet network 1 and second being unique for each interconnection network-element. This topological identifier is therefore a unique differentiator for the interconnection network-element with which it is associated.

Additionally, the secondary interconnection network-elements 4 are configured to enrich the IP address request that they receive from the terminal network-elements 6 with the indication of the corresponding connection port numbers 5 through which they respectively received these IP address requests.

The addressing server incorporates the necessary intelligence for reading and interpreting these two added items of information that are both topological identifier of the secondary interconnection network-element 4 and also the identifier of the connection port 5 through which the IP address request arrived before being transmitted to it.

FIG. 2 is a schematic representation of an implementation of the process of assigning a network address to a terminal network-element according to an embodiment of the invention.

A terminal network-element 6 called "user 1" sends an IP address request to the secondary interconnection network-element 4 to which it is connected by means of one of the connection ports 5 of this secondary interconnection network-element 4. This IP address request transmission 21 corresponds to the first "Discovery" message of the DORA session of the DHCP protocol.

The secondary interconnection network-element 4 adds a location for the terminal network-element 6 to this IP address request. The location of this terminal network-element 6 includes both the topological identifier for this secondary interconnection network-element 4 and also the number of this connection port 5, and it could also include an indication distinguishing between for example a calculation server and an associated hardware controller.

The topological identifier represents the location of the secondary interconnection network-element 4 in the Ethernet network 1 and was assigned to this secondary interconnection network-element 4 during configuration thereof by the addressing server 2 via annex connections 9 of the parallel network ("sideband" type network).

The connection port 5 number is the number of the connection port 5 through which this terminal network-element 6 is connected to this secondary interconnection network-element 4.

The discriminating indication indicates for example that it is the calculation server and not the hardware controller thereof which is requesting the IP address, or else the inverse according to the scenario, when the calculation server and the hardware controller thereof are both connected to this secondary interconnection network-element 4 by means of a single connection port 5. The discriminating indication is similar for distinguishing between storage memory and the hardware controller thereof.

The IP address request, to which the secondary interconnection network-element 4 dynamically appended the location of the terminal network-element 6, is sent by the secondary interconnection network-element 4 to the primary interconnection network-element 3. This transmission 22 of the request with the location from the secondary interconnection network-element 4 to the primary interconnection network-element 3 is followed by a transmission 23 from the primary interconnection network-element 3 to the addressing server 2 of the request with the location.

The addressing server 2 is able to understand and extract this location in order to send it to the database 7. The addressing server 2 does a real-time decoding, redundant, of the location passed on with the IP address request.

A request for association of the IP address corresponding to the location accompanying the IP address request is sent from the addressing server 2 to the database 7. For all terminal network-elements 6, the database 7 stores the correspondence between this location and this IP address. The database 7 sends back to the addressing server 2 the IP address corresponding to the location received: it is the IP address of the terminal network-element 6 called "user 1." This IP address is sent to the addressing server 2 by means of a transmission 31 of a message containing the IP address for the terminal network-element 6 called "user 1", specifically, for example, the IP address "10.1.1.1."

The return 32 from the addressing server 2 of a response to the IP address request received is done next, where this response contains this IP address "10.1.1.1." This response from the addressing server 2 is returned to the main interconnection network-element 3 through which the IP address request had arrived. A transmission 33 next returns this IP address "10.1.1.1" from the principal interconnection network-element 3 to the secondary interconnection network-element 4 through which the IP address request had arrived. Next a transmission 34 returns this IP address "10.1.1.1" from the secondary interconnection network-element to the terminal network-element 6 that originated the IP address request through the connection port 5 by which this IP address request had been sent.

Upon receiving the IP address "10.1.1.1" thereof, the terminal network-element 6 called "user 1" is functionally fully integrated into the Ethernet network 1 and becomes operational on this Ethernet network 1. Data processing tasks, whether they are calculation tasks if it is a calculation server or data storage tasks if it storage memory, can be assigned to it.

Because of the IP address assignment process, described in connection with FIG. 2, the automatic sequence for assignment of these IP addresses to all of the terminal network-elements 6 of the Ethernet network 1 has been optimized. In fact, it has been shortened and simplified. In case of replacement of the terminal network-element 6 by another in case of hardware failure, the automatic assignment of the new IP address of the replacement network-element will also be carried out more quickly and more simply than with the system from the prior art. The time savings and the simplification are also seen both during the initial installation of the Ethernet network 1 and also during daily maintenance thereof in response to hardware failures which occur therewithin.

Of course the present invention is not limited to the examples in the embodiment described and shown, but it is subject to many variants accessible to the person skilled in the art.

The invention claimed is:

1. A process for assignment, by an addressing server for a network, of a network address to a terminal network-element connected to one of the connection ports of one of the interconnection network-elements of said network, the process comprising:

transmission of a network address request by said terminal network-element to said interconnection network-element;

determination by said interconnection network-element of a location of said terminal network-element where said location combines a topological identifier for said interconnection network-element with at least one identifier for said connection port;

transmission by said interconnection network-element to said addressing server of said request with said location;

assignment by said addressing server to said terminal network-element of said network address based on said location and not on a MAC address;

wherein said network address is an IP address, wherein said terminal network-element has a unique identifier which is the MAC address which is not at all used in said assignment process and which is not accessed by said addressing server when assigning said IP address to said terminal network-element, wherein another parallel network, physically distinct from said network, is used for configuring said topological identifier of a given interconnection network-element of said network, before said transmission of a network address request by said terminal network-element to said interconnection network-element; wherein said another parallel network being a sideband dedicated network for configuring a location parameter of the interconnection network-elements;

wherein said network is a supercomputer, and wherein said network includes more than 1000 of said terminal network-elements.

2. The process for assignment according to claim 1, characterized in that said transmission of said network address request to said interconnection network-element is done automatically by said terminal network-element.

3. The process for assignment according to claim 2, characterized in that said transmission of said network address request to said interconnection network-element is done automatically by said terminal network-element upon addition of said terminal network-element to said network.

4. The process for assignment according to claim 1, characterized in that said network includes a database which stores, for at least one of said terminal network-elements, preferably for several of said terminal network-elements or for the majority of said terminal network-elements, and still more preferably for all said terminal network-elements, a correspondence between said location and said network address, where said addressing server sends said location to said database and said database returns said network address to said addressing server.

5. The process for assignment according to claim 4, characterized in that said addressing server returns said network address to said terminal network-element in response to said request via said interconnection network-element.

6. The process for assignment according to claim 1, characterized in that during said determination, said location combines a topological identifier for said interconnection network-element with an identifier for said connection port and with a discrimination between several terminal network-elements connected to said interconnection network-element by said single connection port, preferably a discrimination between calculation server and hardware controller for said calculation server connected by a single connection port to said interconnection network-element.

7. The process for assignment according to claim 1, characterized in that another parallel network, physically distinct from said network, is used for configuring said topological identifiers of the various interconnection network-elements of said network.

8. The process for assignment according to claim 1, characterized in that said network address assignment is done during installation of said network, for at least one of said terminal network-elements, preferably for several of said terminal network-elements or for the majority of said terminal network-elements, and even more preferably for all said terminal network-elements.

9. The process for assignment according to claim 1, characterized in that said network address assignment is done during replacement of a terminal network-element, for the replacing terminal network-element.

10. The process for assignment according to claim 1, characterized in that said interconnection network-element is a router or switch.

11. The process for assignment according to claim 1, characterized in that said network includes more than 3000 and still more preferably more than 10,000 terminal network-elements.

12. The process for assignment according to claim 1, characterized in that said request is a DHCP request.

13. The process for assignment according to claim 1, characterized in that said network is an Ethernet network.

14. The process for assignment according to claim 1, characterized in that said terminal network-element is a calculation server or a bay for data storage or a calculation server hardware controller.

15. An interconnection network-element:

comprising several connection ports by which at least several terminal elements for a network are connected to said interconnection network-element;

wherein the interconnection network-element receives from the terminal network-elements, preferably from each of said terminal network-elements, a network address request;

wherein the interconnection network-element determines a location of said terminal network-element from which it received said request, where said location combines a topological identifier for said interconnection network-element with at least one identifier for the connection port through which said terminal network-element is connected to said interconnection network-element;

wherein the interconnection network-element transmits said request with said location to an addressing server for said network which is suited for assigning to said terminal network-element an IP network address based on said location and not on a MAC address;

wherein said terminal network-element has a unique identifier which is the MAC address which is not at all used in said assignment process and which is not accessed by said addressing server when assigning said IP address to said terminal network-element, wherein another parallel network, physically distinct from said network, is used for configuring said topological identifier of a given interconnection network-element of said network, before said transmission of a network address request by said terminal network-element to said interconnection network-element element;

wherein said another parallel network being a sideband dedicated network for configuring a location parameter of the interconnection network-elements; and wherein said network is a supercomputer.

16. A network addressing server:

being suited to receive from an interconnection elements for a network, an IP network address request sent by a terminal element on said network connected to said interconnection network-element and associated, by an interconnection network-element, with a location of said terminal network-element; and being suited for assigning a network address based on said location, and not on a MAC address, where said location combines a topological identifier of said interconnection network-element with at least one identifier of the connection port through which said terminal network-element is connected to said interconnection network-element;

said terminal network-element has a unique identifier which is the MAC address which is not used by the assignment component and which is not accessed by the network addressing server when assigning the IP address to the terminal network element;

wherein another parallel network, physically distinct from said network, is used for configuring said topological identifier of a given interconnection network-element of said network, before said transmission of a network address request by said terminal network-element to said interconnection network-element;

wherein said another parallel network being a sideband dedicated network for configuring a location parameter of the interconnection network-elements; and wherein said network is a supercomputer.

17. A terminal network-element connected to an interconnection network-element for a network, the network comprising an addressing server, by one of the connection ports of an interconnection network-element, and comprising:

instructions to send a network address request to said interconnection network-element without specifying a unique terminal network-element identifier thereof; and instructions to receive said network address, said network address is an IP address, assigned by said addressing server based on a location and not on a MAC address, where said location combines a topological identifier of said interconnection network-element with at least one identifier of the connection port through which said terminal network-element is connected to said interconnection network-element;

wherein said terminal network-element has a unique identifier which is the MAC address which is not at all used in said assignment process and which is not accessed by said addressing server when assigning said IP address to said terminal network-element and wherein another parallel network, physically distinct from said network, is used for configuring said topological identifier of a given interconnection network-element of said network, before said transmission of a network address request by said terminal network-element to said interconnection network-element;

wherein said another parallel network being a sideband dedicated network for configuring a location parameter of the interconnection network-elements; and wherein said network is a supercomputer.

18. A process for assignment, by an addressing server for a network, of a network address to a terminal network-element connected to one of a connection port of one of a interconnection network-element of said network, the process comprising:

transmission of a network address request by said terminal network-element to said interconnection network-element;

determination by said interconnection network-element of a location of said terminal network-element where said location combines a topological identifier for said interconnection network-element with at least one identifier for said connection port;

transmission by said interconnection network-element to said addressing server of said request with said location;

assignment by said addressing server to said terminal network-element of said network address based on said location and not a MAC address;

wherein said network address is an IP address, wherein said terminal network-element has a unique identifier which is the MAC address which is not used in said assignment process, wherein another parallel network, physically distinct from said network, is used for configuring said topological identifier of the interconnection network-element of said network, before said transmission of a network address request by said terminal network-element to said interconnection network-element; wherein said another parallel network being a sideband dedicated network for configuring a location parameter of the interconnection network-elements and wherein said network is a supercomputer.

\* \* \* \* \*